(12) United States Patent
Béchade et al.

(10) Patent No.: US 6,415,008 B1
(45) Date of Patent: Jul. 2, 2002

(54) DIGITAL SIGNAL MULTIPLIER

(76) Inventors: Roland Albert Béchade, 40 Susquehanna Trail, Somerville, NJ (US) 08876; Ronald Joseph Cheponis, 121 N. Randolphville Rd., Piscataway, NJ (US) 08854

( * ) Notice: Subject to any disclaimer, the term of this patent is extended or adjusted under 35 U.S.C. 154(b) by 0 days.

(21) Appl. No.: 09/212,052

(22) Filed: Dec. 15, 1998

(51) Int. Cl.$^7$ .............................................. H04L 27/06
(52) U.S. Cl. ...................... 375/376; 375/360; 375/375; 370/519; 327/154; 327/159; 327/161; 327/291
(58) Field of Search ................................ 375/373, 376, 375/371, 327, 294, 360, 344, 374; 327/291, 295, 154, 156, 158–161; 370/516, 519, 518, 503; 331/57, 60

(56) References Cited

U.S. PATENT DOCUMENTS

| | | | |
|---|---|---|---|
| 4,191,998 A | | 3/1980 | Carmody |
| 4,330,751 A | | 5/1982 | Swain |
| 4,338,569 A | | 7/1982 | Petrich |
| 4,527,075 A | | 7/1985 | Zbinden |
| 4,691,170 A | * | 9/1987 | Riley ........................... 328/20 |
| 4,694,504 A | | 9/1987 | Porter et al. |
| 4,773,031 A | * | 9/1988 | Tobin ........................ 364/703 |
| 4,789,996 A | | 12/1988 | Butcher |
| 5,122,761 A | | 6/1992 | Wischermann |
| 5,179,294 A | | 1/1993 | Béchade et al. |
| 5,257,301 A | * | 10/1993 | Vanderbilt .................... 377/47 |
| 5,399,985 A | | 3/1995 | Awata et al. |
| 5,422,835 A | | 6/1995 | Houle et al. |
| 5,448,205 A | | 9/1995 | Rothermel |
| 5,463,337 A | | 10/1995 | Leonwich |
| 5,502,751 A | | 3/1996 | Killian |
| 5,517,155 A | | 5/1996 | Yamauchi et al. |
| 5,568,078 A | | 10/1996 | Lee |
| 5,568,410 A | | 10/1996 | Béchade |
| 5,614,855 A | * | 3/1997 | Lee et al. .................... 327/158 |
| 5,619,170 A | | 4/1997 | Nakamura |
| 5,646,564 A | | 7/1997 | Erickson et al. |
| 5,648,994 A | | 7/1997 | Kao |
| 5,799,049 A | * | 8/1998 | McFarland et al. ......... 375/362 |
| 5,854,755 A | * | 12/1998 | Park et al. ................... 364/703 |
| 5,923,715 A | * | 7/1999 | Ono ........................... 375/376 |
| 6,005,420 A | * | 12/1999 | Yoshizawa et al. ......... 327/116 |
| 6,094,076 A | * | 7/2000 | Sacki ......................... 327/116 |
| 6,226,335 B1 | * | 5/2001 | Prozorov .................... 375/344 |

* cited by examiner

*Primary Examiner*—Stephen Chin
*Assistant Examiner*—Dac V. Ha
(74) *Attorney, Agent, or Firm*—Klarquist Sparkman LLP

(57) ABSTRACT

An electronic circuit that multiplies an input signal using primarily digital components so that the resulting circuit can be fabricated consistently by different foundries. The circuit determines a period for the input signal and converts the period to a digital number (e.g., a binary number). An adder is used to determine an average period over a predetermined number of cycles. By determining the average period, voltage fluctuations are cancelled. A multiplier allows for a variable multiplication of the averaged period. A clock generating circuit uses the results obtained by the multiplier to generate a multiplied output signal. Additionally, the input signal is routinely multiplexed with the generated output signal to ensure phase matching.

23 Claims, 7 Drawing Sheets

DIGITAL SIGNAL MULTIPLIER

FIELD OF THE INVENTION

This invention relates generally to input signals (e.g., clock signals) in integrated circuits, and, more particularly, relates to multiplying and/or reshaping such input signals.

BACKGROUND OF THE INVENTION

In many digital systems, such as those including microprocessors and digital signal processors, the incoming clock needs to be reshaped and/or multiplied. Multiplication is typically accomplished using a phase lock loop (PLL) circuit. PLL circuits lock a generated signal to a reference signal using a feedback control system that brings the two signals into a fixed phase relation. Traditional PLL circuits contain analog components, such as voltage controlled oscillators (VCOs). Manufacturing integrated circuits with analog components results in non-uniform and error-prone products. For example, a design produced by multiple foundries can have different electrical characteristics because of slight variations in the fabrication process. Additionally, analog components must be calibrated, which adds cost and may introduce error.

To overcome the problems of analog components, digital PLL circuits were developed. Known digital PLL circuits require a high frequency input reference signal that allows small clock phase adjustments to be made to a generated output signal. Typically, phase correction is accomplished by a feedback loop wherein the output signal is fed back into a phase comparator for comparison with the input clock. To use such digital PLL circuits, the high frequency input reference signal is typically a much higher frequency than the generated output signal. For example, the reference signal may be twice the frequency of the output signal.

The generated output signal may be used to drive a microprocessor or other integrated circuits. However, recent microprocessors require high frequency clocks. For example, with existing technology, the PLL circuit needs to generate an output signal of nearly 500 MHz. And within a relatively short period of time, for example 3 years or so, microprocessors are expected to run with a 1 GHz clock signal. In order for current PLL circuits to generate a 500 MHz clock, a 1 GHz input reference signal is needed. However, such high-frequency clocks are expensive and difficult to manufacture. Consequently, as microprocessor speeds increase, generating an input reference signal running at a sufficient frequency is becoming increasing problematic.

The output signal may also need to be reshaped. Reshaping may be necessary to obtain a clock signal with a 50/50 duty cycle—a clock signal that has symmetrical high and low states. A 50/50 duty cycle may be obtained by dividing an input clock in half, since the period of the clock signal is assumed constant. However, as already described, dividing a clock signal in half before feeding it to a microprocessor has significant drawbacks, since there are practical limitations on the frequency of the source clock.

Another option for reshaping a clock signal is shown in Béchade, U.S. Pat. No. 5,179,294. The reshaping circuit of Béchade and other digital PLL circuits use delay elements to determine a period of the incoming clock signal. The delay elements are subject to voltage and temperature fluctuations, which can vary the length of the delay. Such variations in the delay elements cause an inconsistent duty cycle in the generated output signal, which effects the performance of the overall circuit.

SUMMARY OF INVENTION

In one embodiment, a multiplier circuit is disclosed that multiplies and/or reshapes an input signal. The multiplier circuit in this embodiment is primarily digital so that an integrated circuit produced by one foundry will have similar electrical characteristics as the same circuit produced by another foundry. Additionally, the multiplier circuit does not require a high frequency reference clock, making it more practical and economical as microprocessor speeds increase.

In one aspect of the illustrated embodiment, a period determining circuit is used to determine the period of an input signal and to convert the period to a digital number, such as a binary number. The period determining circuit may include a delay circuit, a comparator, and an edge detector to continuously or repetitively determine the period of the input signal. A count leading edge may then be used to convert the period into a binary number.

In another aspect of the illustrated embodiment, an adder may be used in conjunction with a multiplier/divider to calculate the average of the period over a predetermined number of cycles. Thus, by calculating an average period, imperfections in the delay circuit due to voltage fluctuations are in effect cancelled.

In yet another aspect of the illustrated embodiment, a variable multiplication control is applied to the multiplier/divider to multiply the averaged signal. The multiplier/divider may be a shifter circuit and the multiplication control may in this case control the direction and the number of bits that are shifted. The shifter may take into account both the division needed for calculating the average period and the multiplication simultaneously. The shifter may be set to shift the accumulated number calculated by the adder.

In yet a further aspect of the illustrated embodiment, a variable delay line is coupled to the multiplier/divider to generate the multiplied or reshaped output signal. A multiplexer may be used to synchronize the variable delay and the original input signal so that phase matching is constantly monitored and maintained.

These advantages and other advantages and features of the inventions will become apparent from the following detailed description, which proceeds with reference to the following drawings. The present invention relates to the novel and non-obvious aspects of the invention individually as well as collectively.

DETAILED DESCRIPTION OF AN ILLUSTRATED EMBODIMENT

Figure 1:
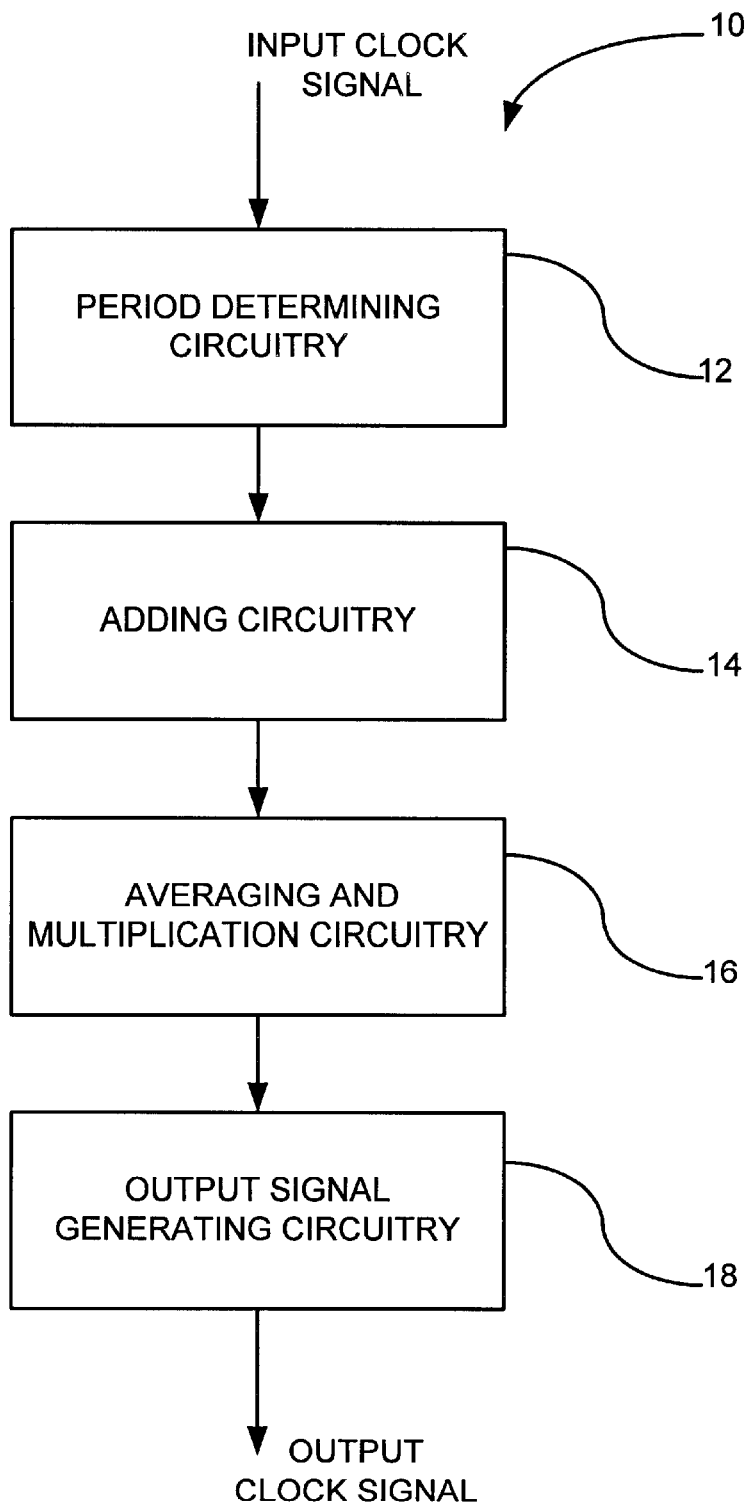
FIG. 1 is block diagram of a multiplier circuit according to one embodiment of the invention.

FIG. 1 is a block diagram of a multiplier circuit 10 according to one embodiment of the invention. An input periodic signal to be multiplied (in this case a clock signal) is supplied to a period determining circuit 12. The input signal is an alternating signal having a fixed or varying period. Although the input signal is typically described below as a clock signal, the input signal may be any desired alternating signal. The period determining circuit 12 continuously or repetitively determines the period of the input clock signal and converts the period to a digital number or format (e.g., a binary number, hexadecimal number, etc.). For illustrative purposes the digital format will be described as a binary number. An adding circuit 14 receives the binary number representing a period for the current cycle from the period determining circuit 12. The adding circuit 14 adds the binary number over successive periods for a number of cycles, typically a predetermined number of cycles (between 8 and 256 cycles). The number of cycles may alternatively be adjusted dynamically. After the desired number of cycles is reached, an averaging and multiplication circuit 16 effectively divides the total obtained by the adding circuit 14 by the number of cycles. Thus, the averaging and multiplication circuit 16 determines an average period over a number of cycles so that variations in the input signal or discrepancies due to voltage fluctuations are effectively cancelled or minimized. The averaging and multiplication circuit 16 then multiplies the average period by a desired number to obtain a multiplication factor. As described more fully below, the dividing and multiplication may be accomplished in separate steps and by separate circuits, or may be accomplished simultaneously by only one circuit, such as a shifter or a divider. An output signal generating circuit 18 uses the multiplication factor to generate an output signal that is a multiple of the input signal. The circuit can also be used to only reshape the input signal. In such a case, the averaging and multiplication circuitry determines the average period and effectively multiplies by a multiplication factor of 1. As is described more fully below, the output signal generating circuitry 18 may also use the input signal to phase match the input and output signals.

Figure 2:
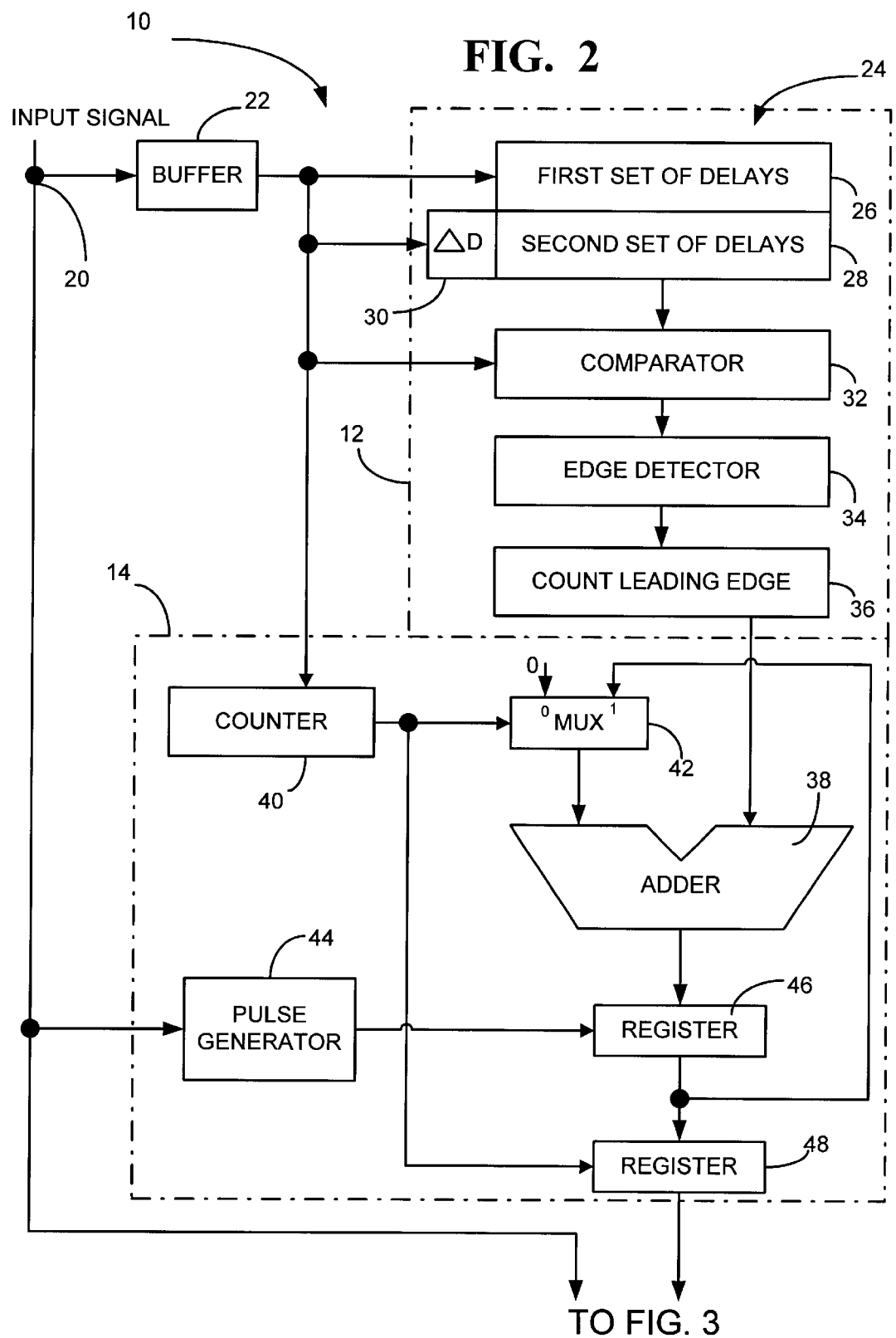
FIG. 2 is a detailed circuit diagram of a first portion of a multiplier circuit of FIG. 1.
Figure 3:
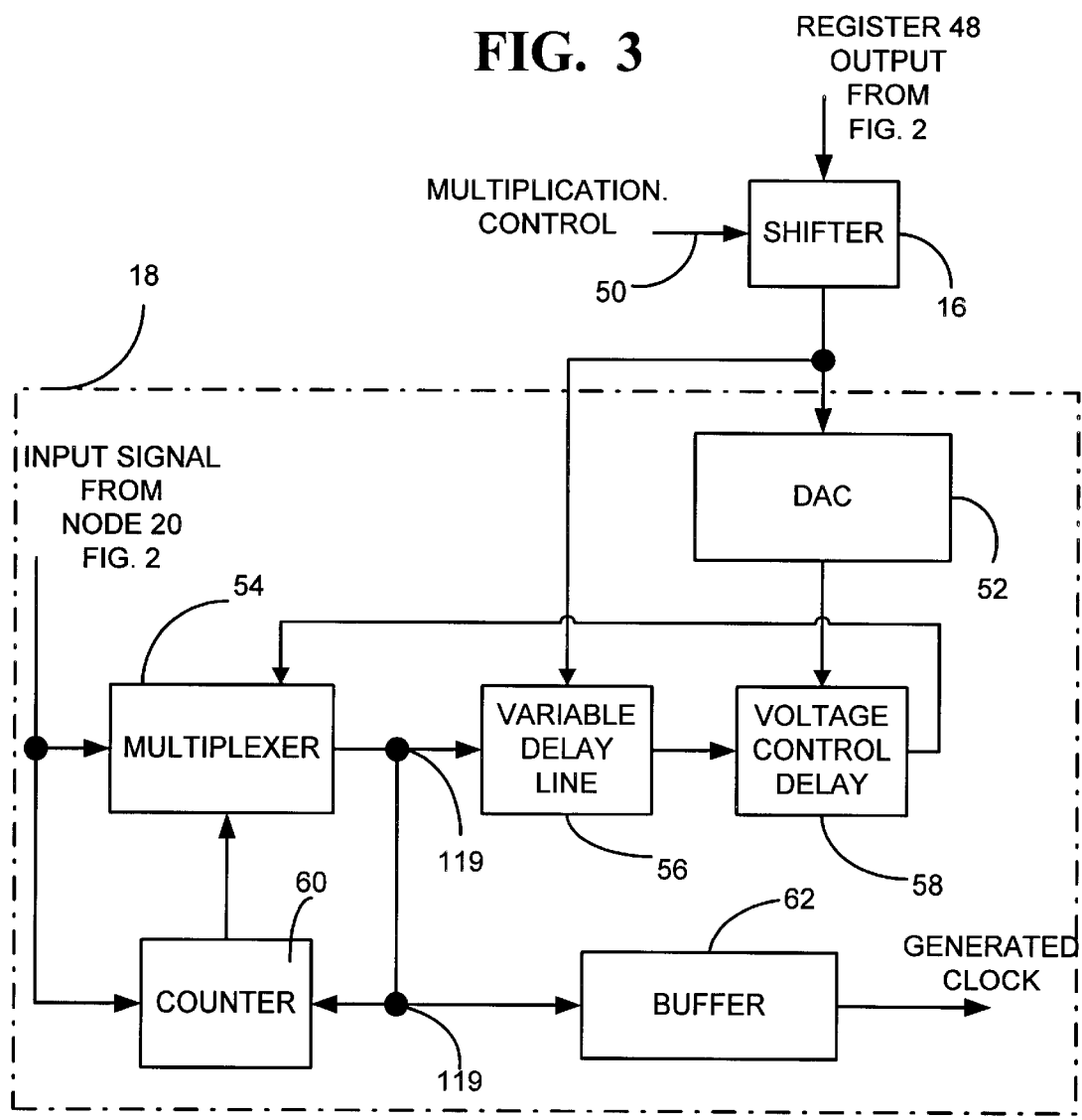
FIG. 3 is a detailed circuit diagram of a second portion of the multiplier circuit of FIG. 1.

FIGS. 2 and 3 show a more detailed circuit diagram of an exemplary embodiment of the multiplier circuit 10. An illustrated form of the period determining circuitry and adding circuitry are shown by dashed boxes 12, 14, respectively, in FIG. 2. Also, one form of the averaging and multiplying circuitry 16 and output signal generating circuitry 18 are shown in FIG. 3. Turning first to FIG. 2, the input signal is applied to an input signal node 20, wherein the illustrated input signal is an external clock signal to be multiplied or reshaped. A buffer 22 is coupled to the input signal node 20 and drives the clock signal to the internal circuits within the multiplier 10. The buffered clock signal in this specific embodiment is applied to a delay circuit 24 that includes a first set of delays 26 and a second set of delays 28. A differential delay element 30 is coupled in series with the second set of delays 28. The differential delay element 30 and second set of delays 28 are used to increase the granularity of the circuit 10 by ensuring that the clock signal passing through the second set of delays 28 lags by half a delay stage behind the first set of delays 26. A variety of different electrical components can be used for the differential delay 30. For example, the differential delay may be a transfer gate or a buffer. Other possible differential delays are well-known in the art and can be used as well. In the case where the differential delay is a buffer, it should be sized differently than buffers used in the first and second sets of delays. In any event, the first and second sets of delays 26, 28 in this embodiment include multiple stages of delay elements coupled in series. A more specific example of the first and second sets of delays are described more fully below in relation to FIG. 6.

Figure 4:
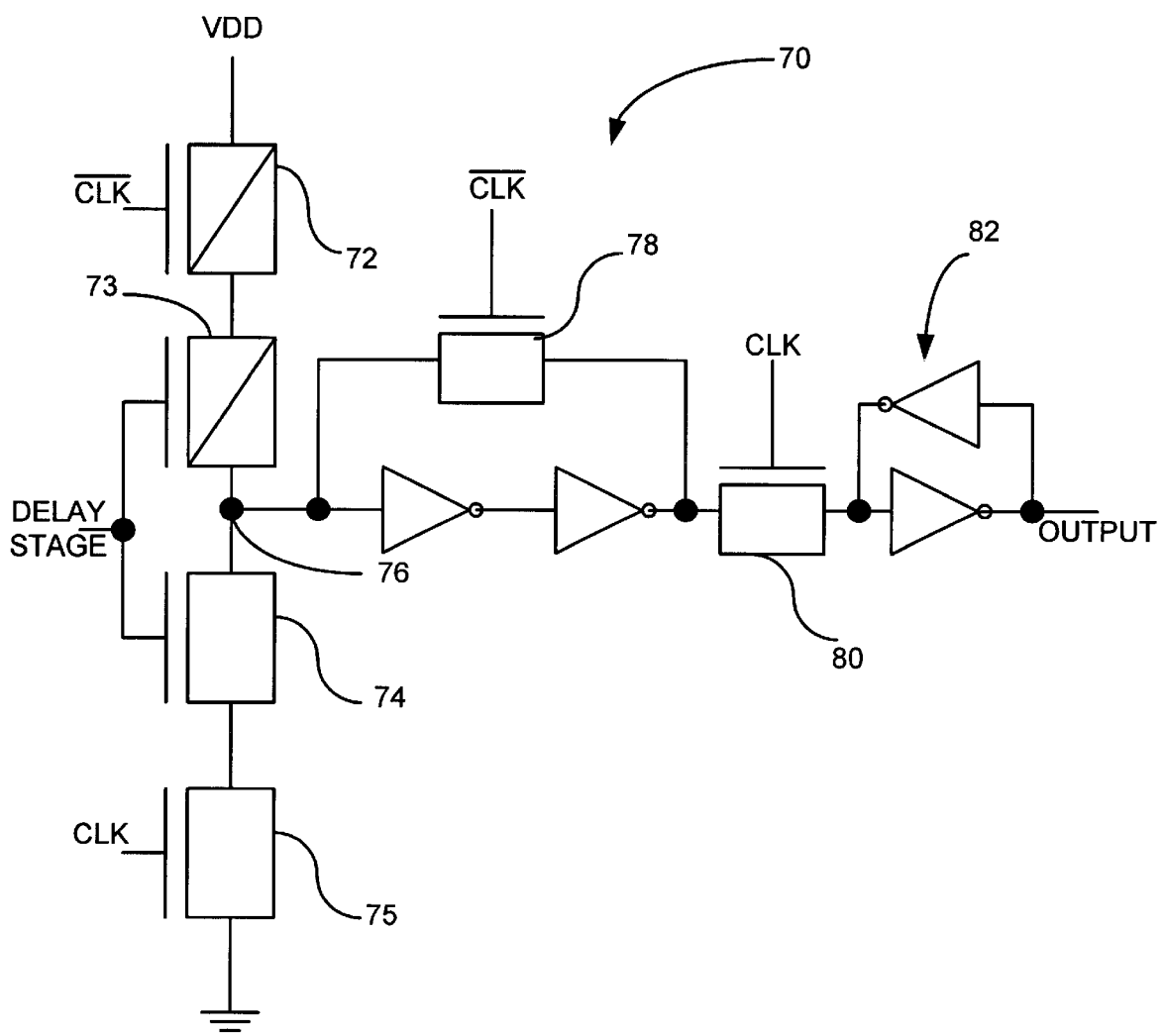
FIG. 4 is a circuit diagram of a comparator circuit that may be used in the circuit of FIG. 2.

A comparator 32 (FIG. 2) is used to compare an output from each delay stage from the first and second sets of delays 26, 28. The illustrated comparator 32 includes multiple comparator stages, one of which is shown in FIG. 4 and described more fully below. The illustrated comparator 32 has multiple outputs that can be used to determine the number of delay stages needed to delay the input clock signal by one full cycle. An edge detector 34 and a count leading edge 36 form a binary converter that converts the output of the comparator 32 to a binary number. The binary number represents the number of delay stages needed to delay the input clock by one full cycle. There are a variety of ways to determine a period as is well known in the art and other period determining circuits may be used. For example, the edge detector 34 and count leading edge 36 may be eliminated and replaced with alternative circuits for creating a binary number. Additionally, alternative circuits for the delay 24 and comparator 32 may be used.

The adding circuit 14 receives the output of the period determining circuit 12. The adding circuit 14 sums the binary number provided by the binary converter over a number of cycles. The number of cycles may be predetermined or change dynamically and may vary based on the application. Virtually any number of cycles may be used. For example, the cycles can be a number between 8 and 256. The illustrated adding circuit includes an adder 38, a counter 40, a multiplexer 42, a pulse generator 44, and two registers 46, 48. The illustrated counter 40 may be preset with a predetermined number of cycles and when the counter exceeds that number, it switches the multiplexer 42 to an input labeled as input 0. Input 0 on the multiplexer 42 has a constant low voltage level applied thereto. The adder therefore adds a binary 0 from input 0 and a binary number received from the period determining circuit 12. This addition represents the first cycle in the predetermined number of cycles which the binary number is continually added. On the next cycle, the counter 40 switches the multiplexer 42 to an input labeled input 1, which adds register 46 (an accumulated sum) and the binary number from the period determining circuit 12. The pulse generator 44 creates a pulse in response to the input signal on the input signal node 20. The pulse generator can take a wide variety of forms, such as a NAND gate and inverter combination, as is shown in Bechade et al., U.S. Pat. No. 5,179,294, which is hereby incorporated by reference. In this example, with each cycle, the pulse generator 44 causes the output of the adder 38 to be loaded into register 46 to accumulate the successive summations of the binary numbers from the period determining circuit 12. The data stored in register 46 is fed back through the multiplexer 42 to be added to the next binary number passed by the period determining circuit 12. When counter 40 exceeds the predetermined number, it not only resets the adder 38 as described above, but also loads register 48 with the total summation of binary numbers accumulated over the predetermined number of cycles. Thus, the register 48 contains a summation of binary numbers representing successive periods added over a number of cycles. This summation can now be used to determine the average period. One skilled in the art will recognize that there are a variety of ways to implement the adding circuit 14. For example, some adding circuits do not include a pulse generator, counter, or multiplexer. Other adding circuits may readily be used instead of the specific form of adding circuit 14 shown in FIG. 2.

FIG. 3 shows the remainder of the illustrated multiplier circuit 10. The averaging and multiplication circuit 16 (also called the multiplier) is a shifter in this example that performs multiplication or division based on the direction of shifting. The shifter receives the summation from register 48 (FIG. 2). The number of bits the shifter is shifted depends on a variable multiplication control 50 and the number of cycles that are added in the adding circuit 14. To obtain an average period, the shifter is shifted so as to divide the number received from register 48 by the number of cycles. For example, if the binary number from the period determining circuit 12 is added in the adder over 32 cycles, the shifter is shifted by six bits to account for dividing by 32. This results in a binary number representing the average period of the input clock signal. Additional shifting is performed to obtain a multiplication factor for the average period. The number of bits the shifter is shifted is controlled by the variable multiplication control input 50, which may be a register that is loaded with the desired shifting data. Alternatively, the multiplication control 50 may be hard-wired. Although the division to obtain the average period and the multiplication are performed at the same time by a single shifter, the division and multiplication can be split amongst different electrical components so that an average period is calculated separately from the multiplication. Typical multiplications include a multiplication by 2, 4 or 8, but virtually any multiplication factor can be used. For example, a multiplication by 1 causes the generated output signal to be the same frequency as the input signal, but reshaped to have a uniform duty cycle. Although the circuit 16 is called a multiplier herein, it is understood that the multiplier is so named because it is determining a multiplication factor. In actuality, the multiplier may be shifting so as to divide rather than multiply. Consequently, a divider may be used instead. Alternatively, the circuit 16 may perform a true multiplication. Additionally, although the multiplier is shown as a shift register, other techniques for multiplication may be used as are well known in the art.

The output signal generating circuit 18 uses the multiplication factor determined in the averaging and multiplication circuit 16. In the illustrated example, the signal generating circuit 18 includes a digital-to-analog converter 52 (DAC), a multiplexer 54, a variable delay line 56, a voltage control delay 58, a counter 60, and an output buffer 62. As explained further below, many of these components can be eliminated based on the application or an entirely different signal generating circuit may be used instead. Most of the bits from the shifter go to the variable delay line 56. However, the two lowest bits of the shifter, or the least significant bits, go to DAC 52. The DAC converts the two lowest bits to analog to control the voltage control delay 58. The voltage control delay fine-tunes the amount of delay to provide greater accuracy. The variable delay line 56 and the voltage controlled delay 58 together delay the generated clock signal by an amount directly related to the output of the shifter. This delay determines the frequency of the output clock signal. If less accuracy is needed, the DAC 52 and voltage controlled delay 58 can be eliminated. Alternatively, if greater accuracy is desired, additional bits from the shifter can be passed to the DAC 52 and voltage controlled delay 58. The multiplexer 54 switches between the output of the voltage control delay 58 and the input clock signal based on the counter 60. In this embodiment, once per cycle, the counter 60 allows the input clock signal to pass to the variable delay line 56 so as to synchronize the generated output signal to the input signal, ensuring that they are phase matched. The output buffer 62 provides sufficient power so that the generated clock signal can be used by other circuits within the system without signal degradation. Those skilled in the art will recognize that the output signal generating circuit is a form of a ring oscillator. The number of cycles that the binary number is accumulated over provides additional accuracy by averaging out jitter and power supply noises. For example, if the multiplication circuit multiplies the frequency by 4 and sums the binary count over 32 cycles, the binary count has an additional 4 bits of data below the decimal point. These bits can be used to fine tune the delay in the ring oscillator by converting these bits to analog and applying the bits to a voltage controlled delay 58. Alternatively, the bits can be used to control a network of load capacitors instead of or in addition to the voltage control delay. Although a specific output signal generating circuit is shown, alternative output signal generating circuits may be used. For example, the counter 60 and multiplexer 54 can be eliminated if phase matching is not desired.

Figure 6:
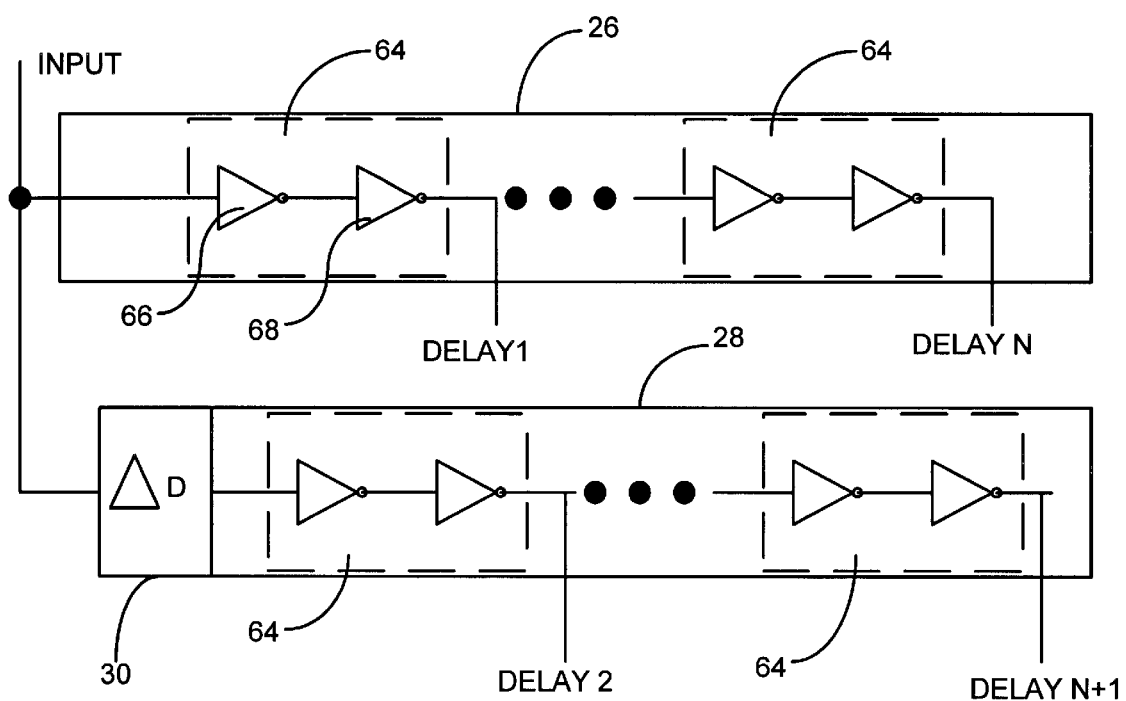
FIG. 6 is a circuit diagram of an exemplary circuit for providing first and second set of delays of FIG. 2.

FIG. 6 shows an example of the first and second set of delays 26, 28 in detail. The delays 26, 28 include multiple delay stages 64 coupled in series. The delay stages 64 comprise two serially coupled inverters, such as inverters 66 and 68, that delay the input signal by the propagation delay of the inverters. The number of delay stages is shown generically by having the last stage labeled as "delay N" in the first set of delays 26 and "delay N+1" in the second set of delays 28. Also, delays 26, 28 in the illustrated form have multiple outputs, one for each stage. The outputs are labeled corresponding to the amount of delay. For example, the output delay1 is the shortest delay within both sets of delays 26, 28. The output labeled delay2 lags behind delay1 by the amount of delay caused by differential delay 30. DelayN+1 represents the input signal after it passes through all other delay stages in the second set of delays 28. Those skilled in the art will recognize that alternative delay circuitry may also be used. In general, lowering the delay within the delay stages 24 and increasing the number of delay stages improves the resolution of the waveform output from the multiplier circuit 10.

FIG. 4 shows one exemplary comparator stage 70 of the illustrated comparator 32. In this form of comparator, there is one comparator stage per output of the first and second set of delays 26, 28. The comparator stage 70 compares one of the delay stage outputs to the input clock signal after it passes through buffer 22 (FIG. 1). The stage 70, in the form shown, includes complementary metal oxide semiconductor (CMOS) circuits in a pullup/pulldown relationship. P-channel field-effect transistors (PFETs) 72, 73, which are indicated by a rectangle with a diagonal line therein, form the pullup portion of the stage. N-channel field-effect transistors (NFETs) 74, 75 form the pulldown portion of the stage. When the input signal is at a high-voltage level, both the NFET 75 and the PFET 72 are turned on since the input signal (shown as a clock signal) is applied to the NFET 75 and its inverted sense is applied to PFET 72. Thus, the voltage level of the delay stage controls whether a node 76 is pulled up or down. If the delay stage output is a low-voltage level, PFET 73 is turned on, and NFET 74 is turned off, creating a path between node 76 and Vdd. Consequently, the node 76 is charged to a high-voltage level. If the delay stage output is a high-voltage level, NFET 74 is turned on and PFET 73 is turned off. Thus, node 76 is pulled to a low-voltage level. When the input clock signal transitions to a low-voltage level, which is inverted and applied to an NFET 78, the NFET 78 turns on to latch the voltage level stored on node 76 by virtue of a feedback loop. When the input clock signal transitions to a high-voltage level, it is applied to the gate of the NFET 80, which passes the stored voltage level to an output latch 82. There are many techniques known in the art for comparing and latching data. The particular comparator and latch used are not of importance. The output of all of the comparator stages within comparator 32 forms a string of 0's followed by a string of 1 s, followed by a string of 0's, etc. The strings mimic the input clock signal in increments of a fraction of a nanosecond, as defined by the delay in the delay circuit 26.

Figure 8:
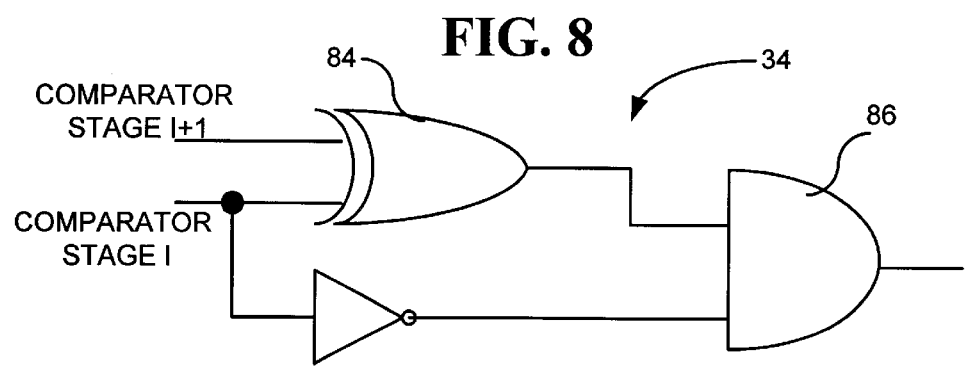
FIG. 8 shows one form of an edge detector that may be used in the multiplier circuit of FIG. 1.

FIG. 8 shows one stage of an exemplary edge detector 34. The illustrated edge detector 34 includes an EXCLUSIVE OR gate 84 having inputs coupled to comparator stage I and I+1 (where I represents a stage). The results of the EXCLUSIVE OR are ANDED in AND gate 86 with the inverse of comparator stage I. Looking at all of the stages of the edge detector should yield a result where all of the outputs of the edge detector are a logic low except one, which represents a rising edge of the input clock signal. Other types of edge detectors may be used. Whether a rising or falling edge of the clock is detected is not important as either may be used. The output of the edge detector 34 is fed into the count leading edge 36 (FIG. 2). The count leading edge converts the output of the edge detector 34 to a binary number. Numerous count leading edges can be used, as is well known in the art. For example, the count leading edge may be a priority encoder, a count-leading zero, or a count leading one. For an example of a count leading zero, see U.S. Pat. No. 5,568,410, to Béchade, which is hereby incorporated by reference.

Figure 5:
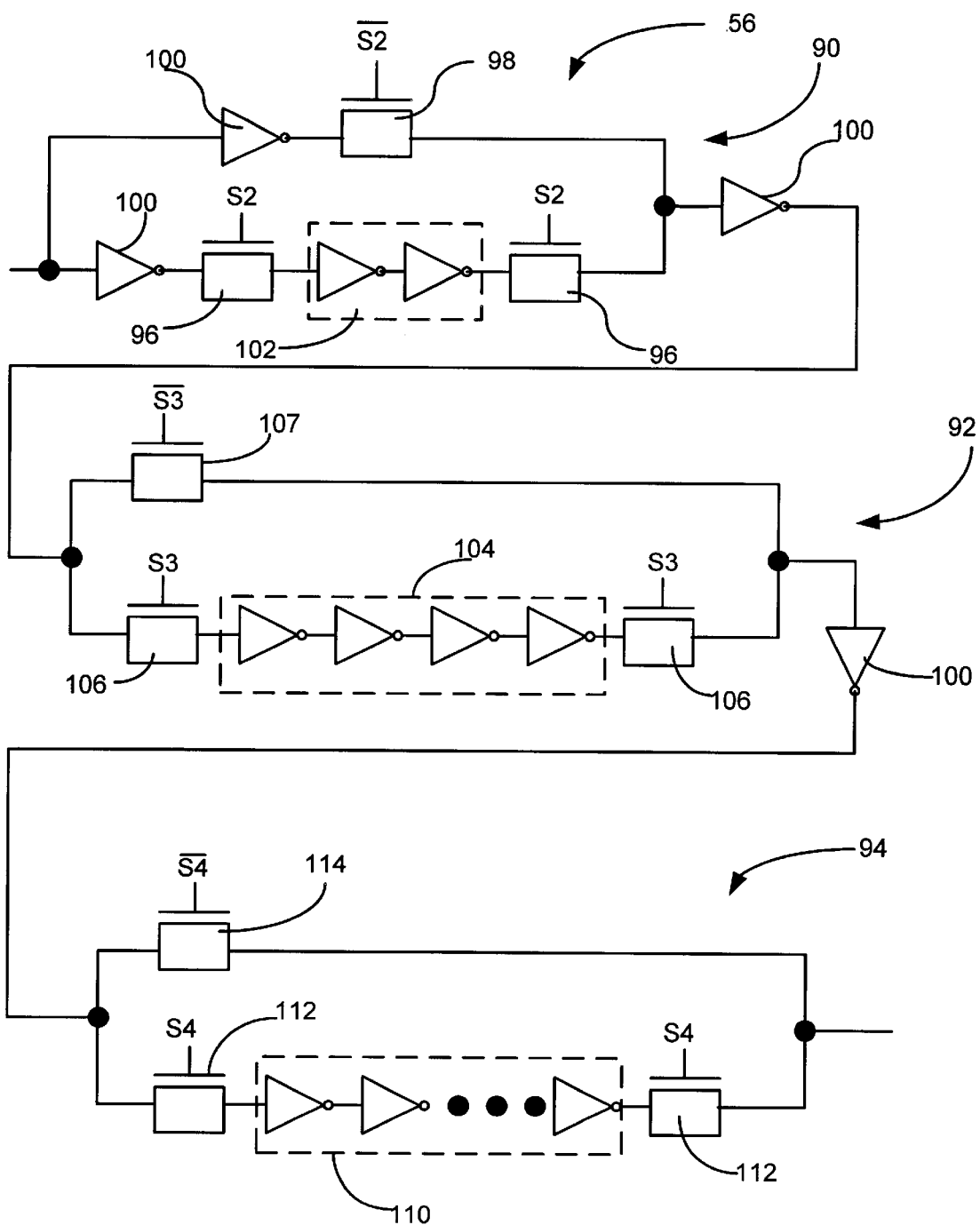
FIG. 5 is a circuit diagram of an exemplary variable delay line that may be used in the circuit of FIG. 3.

FIG. 5 shows further details of one form of an exemplary variable delay line 56. Three stages, 90, 92 and 94, are shown for the variable delay line, but additional stages are typically used. Turning first to stage 90, the output of bit 2 from the shifter 16 (i.e., labeled as S2) is applied to the NFETs 96 and the inverse of S2 is applied to NFET 98. Standard buffering is accomplished by buffers 100 between stages, and also on both inputs to the input stage 90. Stage 90 includes a two-inverter delay 102. The input to the variable delay line 56 corresponds to the generated output clock before passing through buffer 62 (see FIG. 2). If the shifter bit S2 is a high logic level, the two-inverter delay 102 is used to delay the generated clock signal. Alternatively, if the shifter bit S2 is a logic low, the transistor 98 is activated and transistors 96 are deactivated so that the stage 90 does not add to the delay, since the two-inverter delay 102 is bypassed.

Stage 92 is substantially similar to stage 90, except the delay is twice as long as the delay stage 90 because of the four inverters 104 between the transistors 106. Also, the third shifter bit S3 is coupled to transistors 106 while the inverse of S3 is applied to the transistor 107.

Stage 94 has a similar configuration, with eight inverters 110 situated between transistors 112. When S4 is activated at a logic high, the transistors 112 cause the clock signal to be delayed by the inverters 110. When S4 is not activated at a logic low, the transistor 114 is on, thereby causing the stage 94 to provide no additional delay since the inverters 110 are by passed. Thus, the output of the shifter 16 controls the variable delay line 56 to determine the amount that the generated output signal from buffer 62 (FIG. 3) is delayed. Additionally, the voltage control delay 58 causes additional delay as determined by shifter bits S1 and S0, as is well understood in the art. Although a specific variable delay 56 is shown as using inverters, those skilled in the art will recognize that alternative variable delays may be used.

Figure 7:
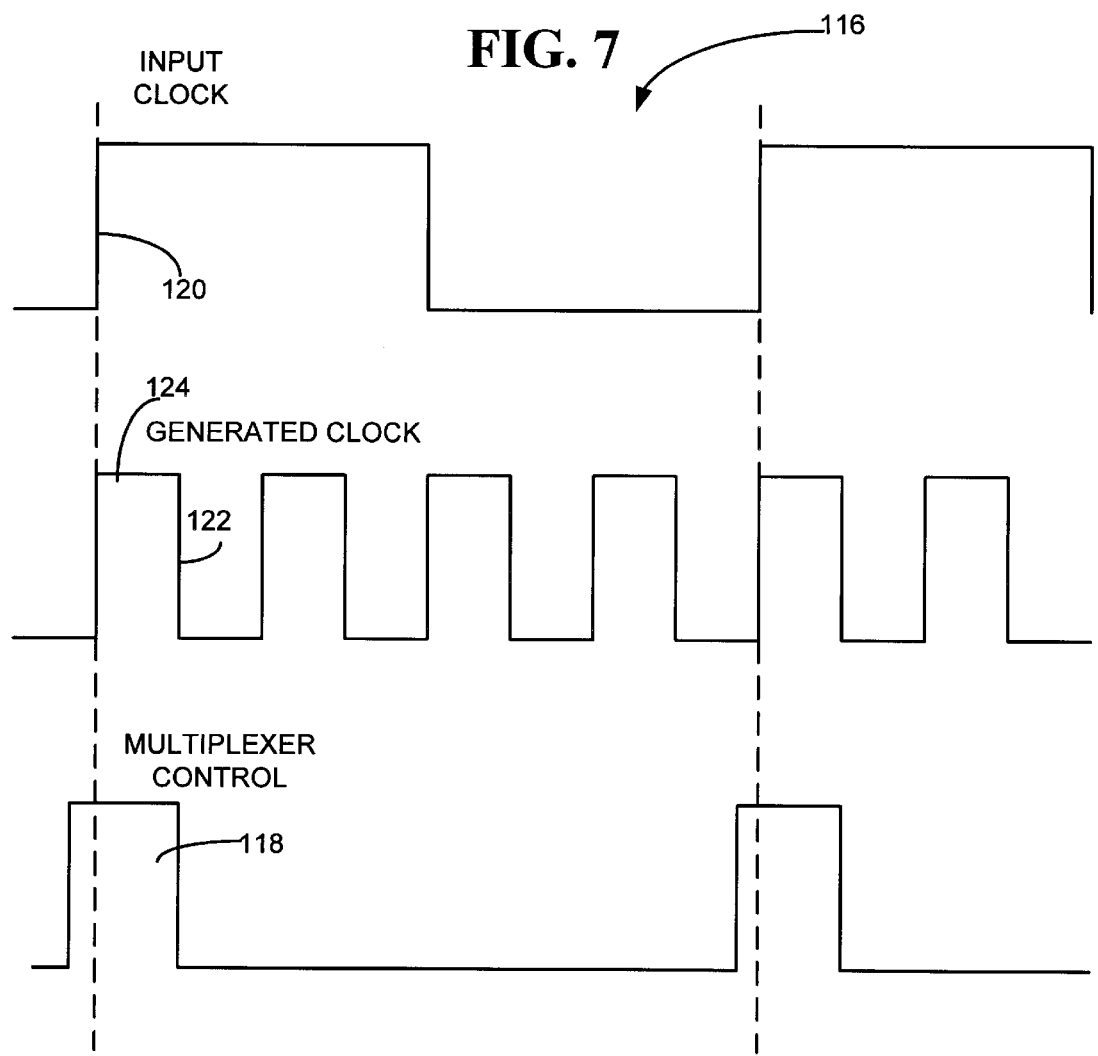
FIG. 7 shows an exemplary timing diagram for the multiplier circuit of FIGS. 2 and 3.

FIG. 7 shows a timing diagram 116 that includes the input clock signal on node 20 (FIG. 2), the generated output clock signal 124 supplied from buffer 62 (FIG. 3), and the multiplexer control signal generated by the counter 60 (FIG. 3). The counter 60 generates a pulse 118 just prior to the leading edge 120 of the input clock signal. The short pulse 118 allows the input clock signal to pass through the multiplexer to node 119 (see FIG. 3). This allows the input clock to resynchronize the generated clock every cycle. The resynchronization could occur every cycle or less frequently depending on the application. On the falling edge of the pulse 118, the multiplexer switches to the output of the voltage control delay 58, forcing the generated clock to a low voltage level on the edge 122. However, in this embodiment, the pulse 124 travels through the variable delay line 56 and the voltage control delay 58 and feeds back through multiplexer 54 back into the variable delay line 56, and so on. Consequently, a multiplied clock signal is generated at node 119 and is synchronized every period of the input clock signal so that phase matching is achieved.

Having illustrated and described the principles of the invention in a preferred embodiment, it should be apparent to those skilled in the art that the embodiments can be modified in arrangement and detail without departing from such principles.

For example, although the multiplier circuit is described as including a multiplexer for synchronizing the input signal and the output signal, this aspect of the invention need not be included if phase matching is not desired.

Additionally, although the multiplier is shown as a shifter, other multiplier and or divider circuits may be used.

Additionally, although the illustrated embodiments are shown primarily performed in hardware, one or more components may be performed in software.

Still further, the circuit may be used with any desired voltage levels representing a logic high and a logic low.

In view of the many possible embodiments to which the principles or invention may be applied, it should be recognized that the illustrated embodiments are only an example in accordance with the invention and should not be taken as a limitation on the scope of the invention. Rather, the invention is defined by the following claims. We therefore claim as the invention all such embodiments that come within the scope of these claims.

We claim:

1. A digital circuit for multiplying a periodic input signal, comprising:

an input signal node that receives the input signal; a period determining circuit coupled to the input signal node that determines a period of the input signal and that delivers the period in digital format;

an adder coupled to the period determining circuit that adds successive periods received from the period determining circuit over a number of cycles and that delivers a resultant sum;

a multiplier circuit coupled to the adder that receives the sum from the adder and that calculates a multiplication factor therefrom; and an output signal generating circuit coupled to the multiplier circuit that supplies an output signal which is a multiplied version of the input signal based on the multiplication factor.

2. The digital circuit of claim 1 wherein the period determining circuit includes a delay circuit comprising multiple delay stages coupled in series, with each delay stage having an output representing the input signal delayed by a predetermined amount of time.

3. The digital circuit of claim 1 wherein the period determining circuit includes a delay circuit providing an output representing a delayed input signal and a comparator coupled to the output of the delay circuit, the comparator also being coupled to the input signal node for comparing the input signal to the output of the delay circuit.

4. The digital circuit of claim 1 wherein the period determining circuit includes a comparator that determines an amount of delay necessary to delay the input signal by one period and a binary converter coupled to the comparator that converts an output of the comparator to a binary number.

5. The digital circuit of claim 4 wherein the binary converter includes an edge detector and a count leading edge.

6. The digital circuit of claim 1 wherein the multiplier includes a shifter.

7. The digital circuit of claim 1 wherein the multiplier effectively divides the resultant sum to determine an average period of the input signal.

8. The digital circuit of claim 1 wherein the output signal generating circuit includes a variable delay line coupled to the multiplier for delaying the input signal.

9. The digital circuit of claim 1 wherein the output signal generating circuit includes a multiplexer, a variable delay line, and a counter, the multiplexer for switching between the input signal and the variable delay line in response to the counter.

10. The digital circuit of claim 9 wherein the input signal is an input clock signal and the output signal is an output clock signal.

11. The digital circuit of claim 1 wherein the output signal is at least operating at a frequency of 500 MHz.

12. The digital circuit of claim 1 wherein the output signal generating circuit includes a digital-to-analog converter coupled to a voltage control delay.

13. A method of multiplying an input signal, the method including the steps of:

receiving an input signal to be multiplied;

delaying the input signal by passing the input signal through a series of delay stages that include delay stage outputs;

comparing the outputs of the delay stages to the input signal to determine the number of delay stages needed to delay the input signal by one period;

converting the number of delay stages determined in the comparing step to a digital number;

summing the digital number over a predetermined number of cycles; and processing the summation of digital numbers to determine a multiplication factor and generating an output signal that is a multiple of the input signal using the multiplication factor.

14. The method of claim 13 wherein the converting step includes detecting an edge where the input signal makes a transition between a high and a low state.

15. The method of claim 13 wherein the processing step includes shifting the resultant summation by a predetermined number of bits to determine an average number of delay stages needed to delay the input signal by one period.

16. The method of claim 15 further including applying the shifted resultant summation to a variable delay line to generate an output signal that is a multiple of the input signal.

17. The method of claim 16 further including multiplexing between the input signal and the output signal to ensure the output signal is in phase with the input signal.

18. A digital circuit for reshaping or multiplying an input signal, comprising:

a delay having multiple stages coupled in series;

a comparator coupled to the delay and the input signal;

a binary converter coupled to the comparator;

a counter coupled to the input signal;

an adder coupled to the binary converter and the counter for summing an output of the binary converter;

a shifter coupled to the adder; and a variable delay line coupled to the shifter to generate an output signal that is a reshaped or multiplied version of the input signal.

19. The digital circuit of claim 18 wherein the binary converter includes an edge detector coupled to the comparator and a count leading edge coupled to the edge detector.

20. The digital circuit of claim 18 further including a multiplexer coupled to the variable delay line and the input signal that switches the output signal between an output of the variable delay line and the input signal.

21. The digital circuit of claim 20 including a counter coupled to the multiplexer.

22. The digital circuit of claim 18 further including a digital-to-analog converter coupled to the shifter and a voltage control delay coupled to the digital-to-analog converter.

23. A digital circuit for multiplying a periodic input signal, comprising:

means for determining a period and producing a signal representing the period in digital format;

means for adding successive periods in digital format over a number of cycles and delivering a resultant sum;

means for averaging the resultant sum and multiplying the averaged sum to deliver a multiplication factor; and means for generating an output signal which is a multiplied version of the input signal based on the multiplication factor.

* * * * *